United States Patent
Oehlert et al.

(10) Patent No.: US 9,630,102 B2
(45) Date of Patent: *Apr. 25, 2017

(54) INPUT DEVICE WITH MEMBRANE TO IMPEDE ENTRANCE OF FOREIGN CONTAMINATES INTO AN ELECTRIC GAMING MACHINE

(71) Applicant: IGT, Las Vegas, NV (US)

(72) Inventors: Michael W. Oehlert, Reno, NV (US); Nathan D. LaBrosse, Reno, NV (US); Brian K. Baker, Reno, NV (US); John L. Beadell, Sparks, NV (US); Steve P. McGahn, Reno, NV (US); Jacquelyn S. Combs, Sparks, NV (US); Thomas D. Waxman, Reno, NV (US); Russell Chudd, Reno, NV (US); Tai Rosander, Reno, NV (US)

(73) Assignee: IGT, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/562,225

(22) Filed: Dec. 5, 2014

(65) Prior Publication Data
US 2015/0087420 A1 Mar. 26, 2015

Related U.S. Application Data

(63) Continuation of application No. 13/594,400, filed on Aug. 24, 2012, now Pat. No. 8,905,847.

(51) Int. Cl.
*A63F 9/24* (2006.01)
*A63F 13/24* (2014.01)
(Continued)

(52) U.S. Cl.
CPC .............. *A63F 13/24* (2014.09); *A63F 13/90* (2014.09); *G07F 17/3209* (2013.01);
(Continued)

(58) Field of Classification Search
CPC ............ H01H 13/063; H01H 2013/066; G07F 17/3209; G07F 17/3211
See application file for complete search history.

(56) References Cited

U.S. PATENT DOCUMENTS 3,876,851 A * 4/1975 McMains ............... H01H 13/06
200/302.2
4,161,637 A * 7/1979 Priesemuth ................... 200/524
(Continued)

FOREIGN PATENT DOCUMENTS

WO WO 2008/109310 9/2008

OTHER PUBLICATIONS

Australian Examination Report for Australian Application No. 2013216629, dated Sep. 1, 2016 (4 pages).

*Primary Examiner* — Dmitry Suhol
*Assistant Examiner* — Carl V Larsen
(74) *Attorney, Agent, or Firm* — Neal, Gerber & Eisenberg LLP (57) ABSTRACT

Methods, systems, or apparatuses for impeding the entrance of foreign contaminates into a housing of a gaming machine may include a gaming controller, a panel, and an input device mounted to the panel. The input device may include a housing. The housing of the input device may include a first section, a second section, and a member moveable with respect to the first and the second sections, wherein the moveable member is configured to be actuated by a player to provide input to the gaming controller; and a membrane disposed between the first section and the panel, wherein the membrane impedes the entrance of foreign contaminates into the housing.

29 Claims, 6 Drawing Sheets

(51) Int. Cl.
*G07F 17/32* (2006.01)
*H01H 13/06* (2006.01)
*A63F 13/90* (2014.01)
*H01H 13/83* (2006.01)
*H01H 13/86* (2006.01)

(52) U.S. Cl.
CPC ........... *H01H 13/063* (2013.01); *H01H 13/83* (2013.01); *H01H 13/86* (2013.01)

(56) References Cited

U.S. PATENT DOCUMENTS

| | | | |
|---|---|---|---|
| 4,673,780 A * | 6/1987 | Kenway | H01H 13/063 200/302.2 |
| 4,766,272 A * | 8/1988 | Guzzon | H01H 13/063 200/302.2 |
| 4,806,908 A * | 2/1989 | Krupnik | 341/22 |
| 5,959,271 A * | 9/1999 | Matsuhashi | 200/61.41 |
| 6,102,394 A | 8/2000 | Wurz et al. | |
| 6,573,466 B1 | 6/2003 | Rapp et al. | |
| 2005/0016826 A1 * | 1/2005 | Li | H01H 13/063 200/341 |
| 2009/0098938 A1 * | 4/2009 | Anderson et al. | 463/37 |
| 2013/0112535 A1 * | 5/2013 | Chu | H01H 13/06 200/302.2 |

* cited by examiner

INPUT DEVICE WITH MEMBRANE TO IMPEDE ENTRANCE OF FOREIGN CONTAMINATES INTO AN ELECTRIC GAMING MACHINE

PRIORITY CLAIM

This application is a continuation of, and claims priority to and the benefit of U.S. patent application Ser. No. 13/594,400, filed on Aug. 24, 2012, the entire contents of which are incorporated herein by reference.

BACKGROUND

1. Field of the Described Implementations

The present disclosure relates generally to gaming machines, and more particularly to input devices of gaming machines configured to impede the entrance of foreign contaminates into the housing of the input device.

2. Description of the Related Art

Many of today's gaming casinos and other entertainment locations feature different single and multi-player gaming systems such as slot machines and video poker machines. The gaming machines may include a number of hardware and software components to provide a wide variety of game types and game playing capabilities. Exemplary hardware components may include bill validators, coin acceptors, card readers, keypads, buttons, levers, touch screens, coin hoppers, ticket printers, player tracking units and the like. Software components may include, for example, boot and initialization routines, various game play programs and subroutines, credit and payout routines, image and audio generation programs, various component modules and a random or pseudo-random number generator, among others.

Gaming machines are highly regulated to ensure fairness. In many cases, gaming machines may be operable to dispense monetary awards of a large amount of money. Accordingly, access to gaming machines is often carefully controlled. For example, in some jurisdictions, routine maintenance requires that extra personnel (e.g., gaming control personnel) be notified in advance and be in attendance during such maintenance. Additionally, gaming machines may have hardware and software architectures that differ significantly from those of general-purpose computers (PCs), even though both gaming machines and PCs employ microprocessors to control a variety of devices. For example, gaming machines may have more stringent security requirements and fault tolerance requirements. Additionally, gaming machines generally operate in harsher environments as compared with PCs.

Gaming machines typically have input devices, such as push-buttons, to receive player inputs, e.g., to place a wager. A gaming machine with such devices may be susceptible to foreign contaminates getting into the machine and interfering with the proper operation of the gaming machine For example, a player may spill liquids containing alcohol, sugar, etc. on the panel of the gaming machine, which may then enter the input device and cause the input device to stop working. An input device on an angled panel may be more susceptible to contamination due to its relative location and/or the accessibility of drinking containers to the player and the input device(s).

The input device of the gaming machine may have a reduced tactile function and/or function. For example, the input device may become inoperable when the foreign contaminate enters the housing or other components of the input device. The inoperability may be caused by the foreign contaminate entering the area between a lens and a bezel of the input device. In such situations, the faulty input device is typically replaced by the casino operator. Modern input devices which include LCD or similar displays can be relatively expensive to replace. Besides the costs incurred by replacing a faulty input device, the casino operator also suffers a decline in income while the gaming machine is inoperable. These and other considerations have led to the evolution of the present invention.

SUMMARY

The present invention solves the problem of foreign contaminants interfering with the operation of input devices of a gaming machine in a cost effective manner without hindering the normal operation of those input devices. According to various examples, an electronic gaming machine for playing an electronic wagering game is disclosed. The electronic gaming machine may include a gaming controller. The electronic gaming machine may also include a panel having a first side and a second side. The electronic gaming machine may include an input device mounted on the panel. The input device may include a housing, which may include a first section having a bottom surface, wherein the bottom surface is engaged against the panel on the first side of the panel. The input device may also include a second section having a top surface, wherein the top surface is engaged against the panel on the second side of a panel. The input device may also include a member moveable with respect to the first and the second sections, wherein the moveable member is configured to be actuated. by a player to provide input to the gaming controller. The input device may further include a membrane disposed between the first section and the panel, wherein the membrane impedes the entrance of foreign contaminates into the housing.

According to one example implementation, an input device is disclosed. The input device may include a housing comprising a bottom wall having at least one upwardly extending side and. a top surface connected to the at least one upwardly extending side. The input device may also include a lens mechanically coupled to the housing comprising of an upper and a lower lens, where the upper and lower lenses are welded together to create the lens, wherein the upper lens is configured to be actuated by a player to provide input to a gaming controller and the lower lens is configured to move with the upper lens during actuation. The input device may also include a bezel surrounding the upper lens. The input device may further include electrical contacts electrically coupled to the upper lens to receive input. The input device may also include a flexible membrane attached to the upper lens and placed over the bezel, wherein the flexible membrane is provided within a channel between the upper and lower lens and is configured to allow movement with the actuation of the upper lens, to provide feedback to the player during actuation and to impede the entrance of foreign contaminates into the electrical contacts.

According to another implementation, an apparatus for an electronic gaming machine to prevent the entrance of foreign objects is disclosed. The apparatus may include a housing comprising a first section, wherein the first section extends into an interior region of the electronic gaming machine, a second section, wherein the second section extends into an exterior of the electronic gaming machine The apparatus may also include a member moveable with respect to the first and second sections. The apparatus may further include a membrane in contact with the first and second sections, wherein the membrane surrounds the moveable member to prevent the entrance of foreign objects into the electronic gaming machine.

BRIEF DESCRIPTION OF THE DRAWINGS

The details of one or more implementations are set forth in the accompanying drawings and the description below. Other features, aspects, and advantages of the disclosure will become apparent from the descriptions, the drawings, and the claims, in which:

DETAILED DESCRIPTION

Numerous specific details may be set forth below to provide a thorough understanding of concepts underlying the described implementations. It may be apparent, however, to one skilled in the art that the described implementations may be practiced without some or all of these specific details. In other instances, some process steps have not been described in detail in order to avoid unnecessarily obscuring the underlying concept.

Referring generally to the figures, a gaming machine, input device and components thereof are shown according to described implementations. Before discussing further details of the gaming device, the input device and/or the components thereof, it should be noted that references to "front," "back," "rear," "upward," "downward," "inner," "outer," "right," and "left" in this description are merely used to identify the various elements as they are oriented in the Figures. These terms are not meant to limit the element which they describe, as the various elements may be oriented differently in various applications.

A spill-resistant edge-lit dynamic input device may improve the tactile function of the input device and/or reduce inoperability. The input device, disclosed herein, prevents foreign contaminates from entering the gap between the lens and the bezel of the input device while maintaining the visual effects of the edge lit dynamic input device and the tactile feel for a player's enjoyment.

Figure 1:
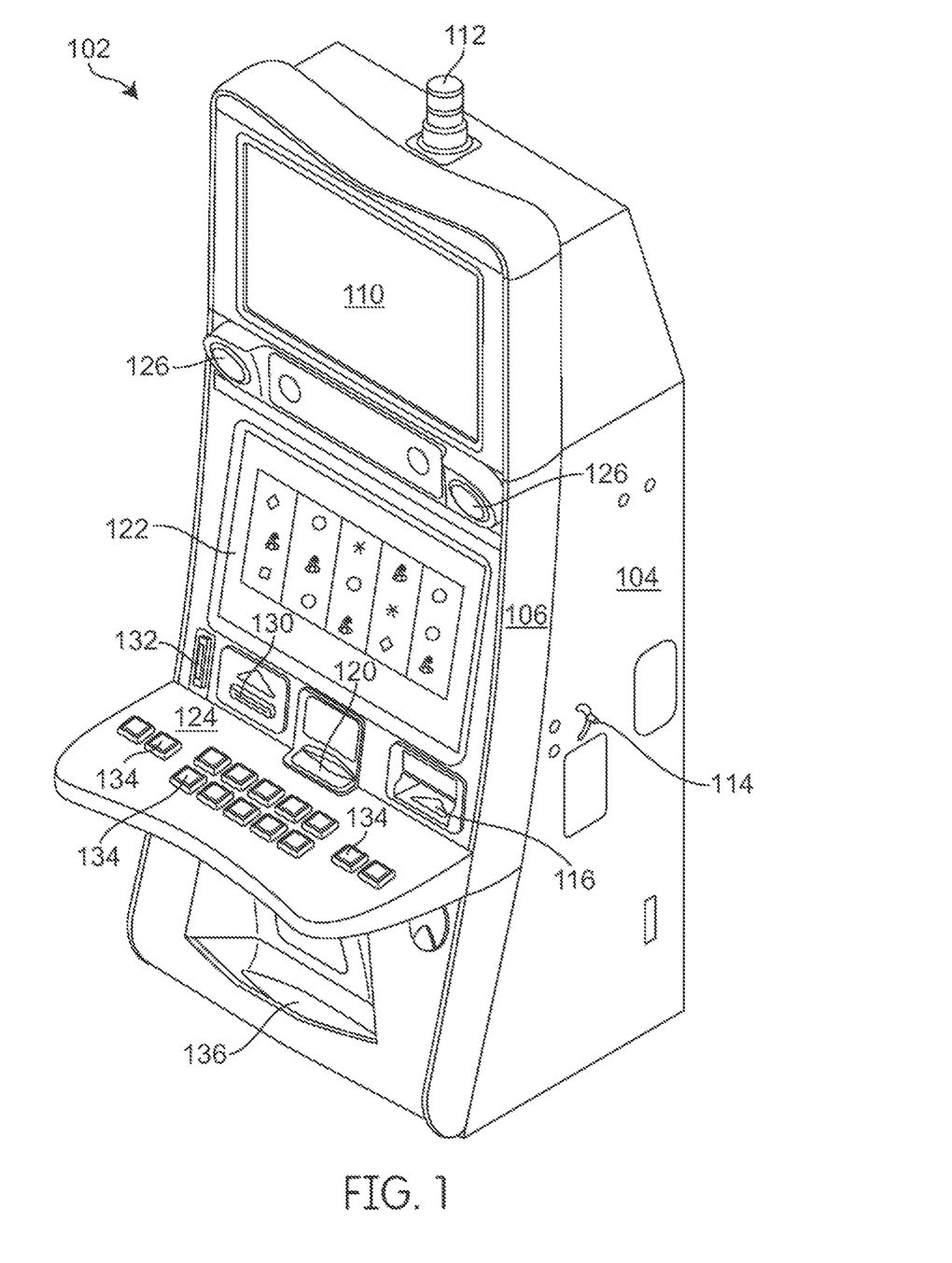
FIG. 1 is an illustration of a gaming machine, in accordance with a described implementation.

Referring to FIG. 1, a perspective drawing of an electronic gaming machine 102 is shown in accordance with described implementations. Gaming machine 102 may include a main cabinet 104, Main cabinet 104 may provide a secure enclosure that prevents tampering with device components, such as a game controller and a coin hopper (not shown) located within the interior of main cabinet 104. Main cabinet 104 may include an access mechanism, such as a door 106, which allows the interior of gaming machine 102 to be accessed. Actuation of a door 106 may be controlled by a locking mechanism 114. In some implementations, locking mechanism 114, door 106, and the interior of main cabinet 104 may be monitored with security sensors of various types to detect whether the interior has been accessed. For instance, a light sensor may be provided within main cabinet 104 to detect a change in light-levels when door 106 is opened and/or an accelerometer may be attached to door 106 to detect when door 106 is opened.

Gaming machine 102 may include any number of user interface devices that convey sensory information to a user and/or receive input from the user. For example, gaming machine 102 may include a first electronic display 110, a second electronic display 122, speakers 126, and/or a candle device 112 to convey information to the user of gaming machine 102. Gaming machine 102 may also include a panel 124 having one or more input devices 134 (e.g., buttons, track pads, etc.) configured to receive input from a user. Panel 124 may include a first side and a second side. Input device(s) 134 may be mounted to panel 124.

In one implementation, display 110 may also be a touch screen display configured to receive input from a user. A gaming controller (not shown) within gaming machine 102 may run a game, such as a wager-based game, in response to receiving input from a user via input devices 134 or display 110. For example, input devices 134 may be operated to place a wager in the game and to run the game. In response, the gaming controller may cause second electronic display 122, which may include electro-mechanical reels, to spin, such as with a slot game, and/or display 110 to display the results of the game.

Gaming machine 102. may also include devices for conducting a wager-based game. For example, gaming machine 102 may include a coin acceptor 132, a printer 120, a bill acceptor 116, and a coin tray 136. Gaming machine 102 may receive physical money and/or tokens via coin acceptor 132 and bill acceptor 116 and dispense physical money or tokens via coin tray 136. Gaming machine 102 may convert received money or tokens into game credits, which may be used within the gaming establishment in lieu, of money. In some cases, gaming machine 102 may also receive and dispense credits. For example, printer 120 may print a ticket for larger payouts that can be redeemed for physical money. In some cases, bill acceptor 116 may be configured to redeem a payout ticket in the form of game credits. Such a configuration may allow a user to transfer credits between gaming machines. According to various implementations, gaming machine 102 may record data regarding its receipt and/or disbursement of money or credit. Gaming machine 102 may provide such accounting data to a remote repository.

Figure 2:
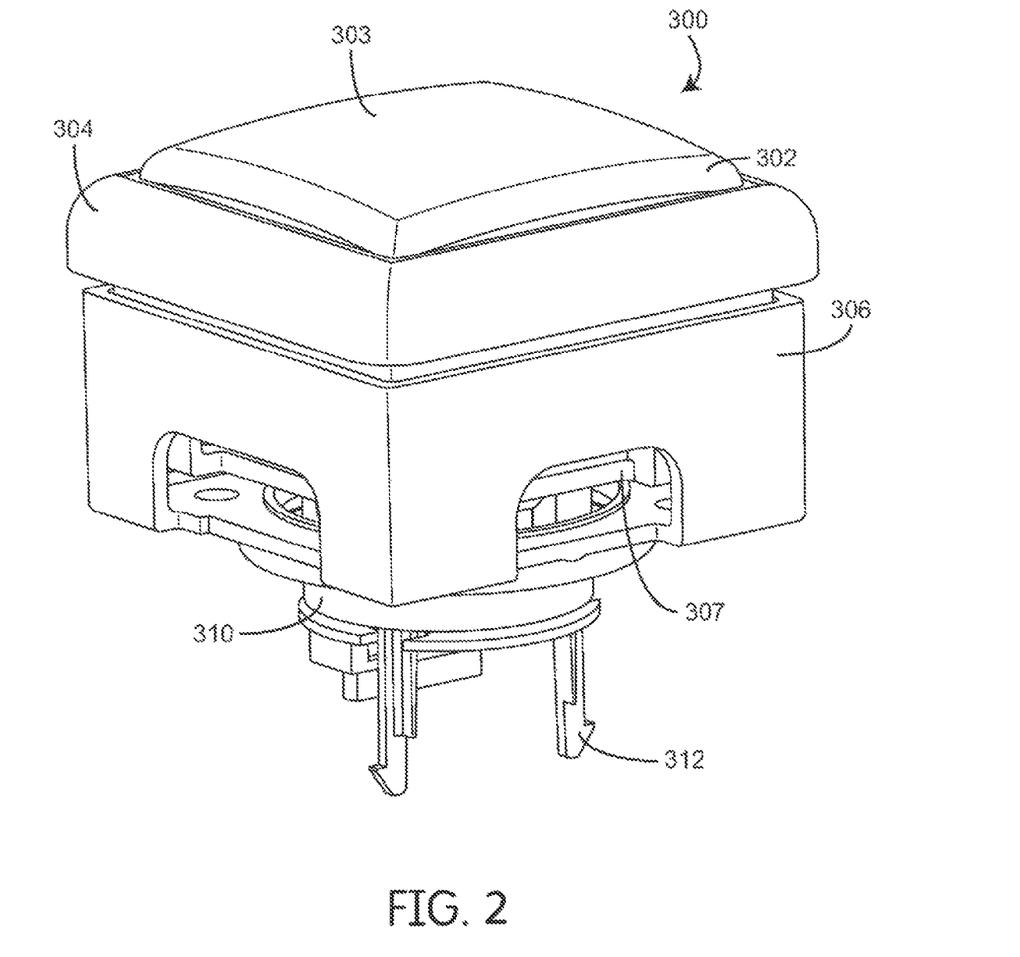
FIG. 2 is a top perspective view of an input device in accordance with a described implementation.
Figure 3:
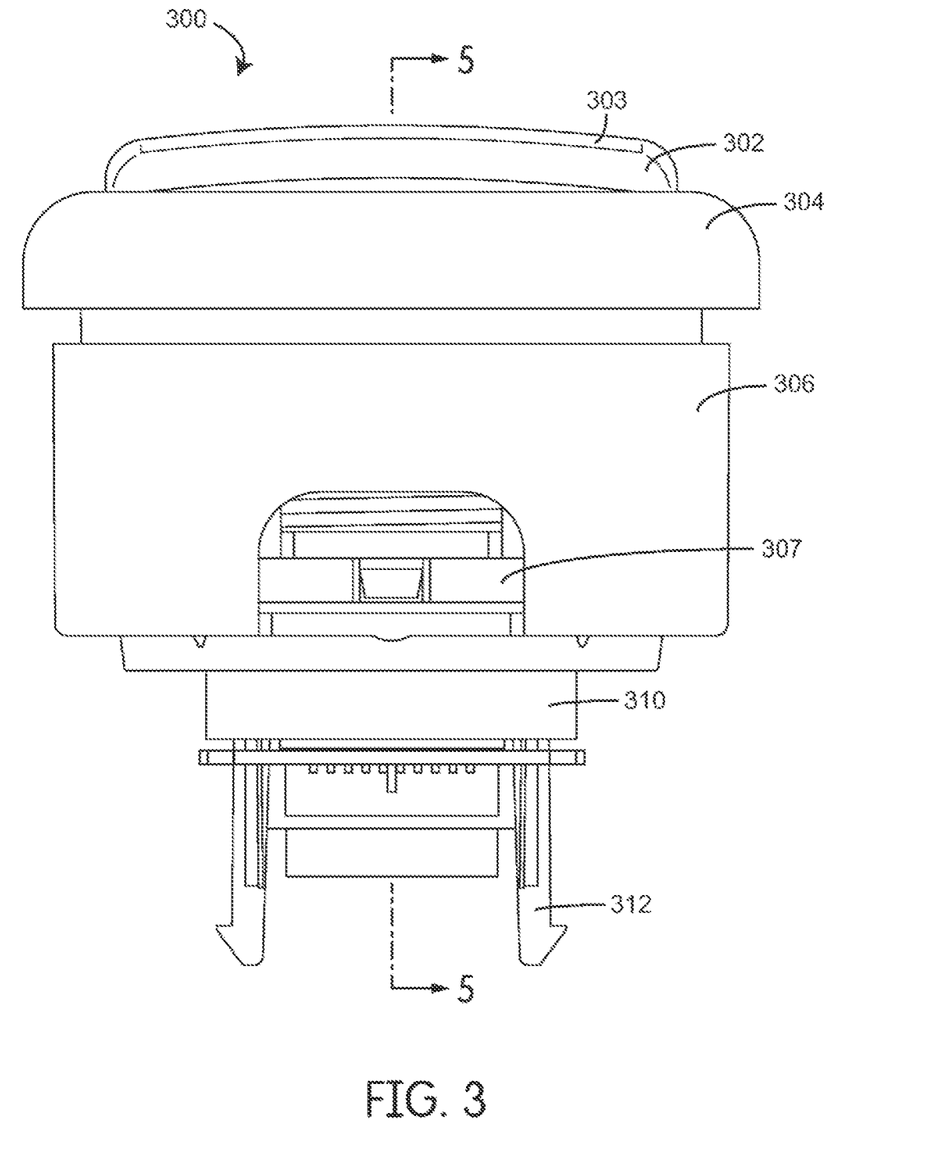
FIG. 3 is a cross-sectional view of an input device in accordance with a described implementation.
Figure 4:
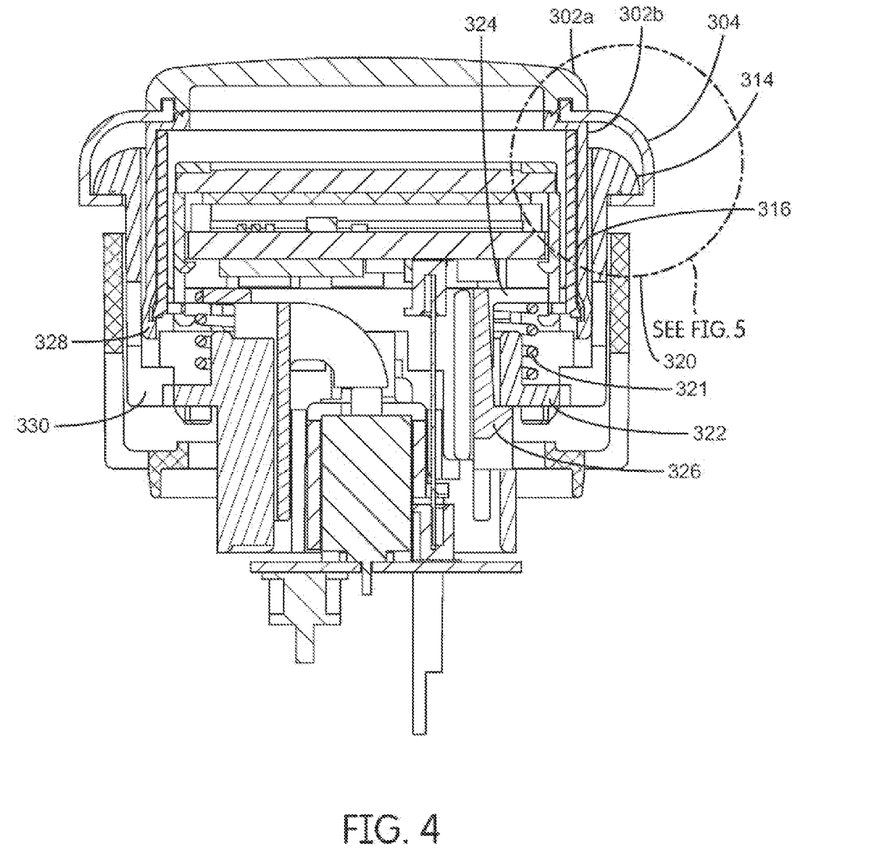
FIG. 4 is a cross-sectional view of the input device of FIG. 3, in accordance with a described implementation.

The input devices 134 are exemplified by input device 300 shown in FIGS. 2 and 3. Input device 300 includes moveable push button member 303 which moves up and down relative to and within an interior of inner housing 30'7 (FIG. 4). Spring 321 (FIG. 4) is positioned on top of an annular lip 322 of the inner housing 307 and underneath an annular ledge 324 of the push button member. The spring 321 exerts an upward force on the push button member 303 and maintains the push button member 303 in an un-pressed upper-most state as shown in FIG. 4. The upward movement of the push button member 303 is limited by a catch 326 coming into contact with the annular lip 322. When a user pushes down on the push button member 303 the force of the spring 321 is overcome and the push button member 303 moves downward within the inner housing 307 until a lower portion of the push button member exterior wall 328 comes into contact with a peripheral portion 330 of the annular lip 322. The input device 300 is activated using known techniques when the push button member 303 is pressed by the user.

Push button member 303 may provide a lens 302 for an illuminated display. The illuminated display may display an image, a video, etc. The player may play a game as directed by the illuminated display. The illuminated display may include an LCD (liquid crystal display), TFT (thin film transistor), plasma, OLED (organic light emitting diode), or LED display. The illuminated display may include graphics from the game, such as directions. Furthermore, content that may have been displayed elsewhere may be displayed. on push button member 303.

Figure 5:
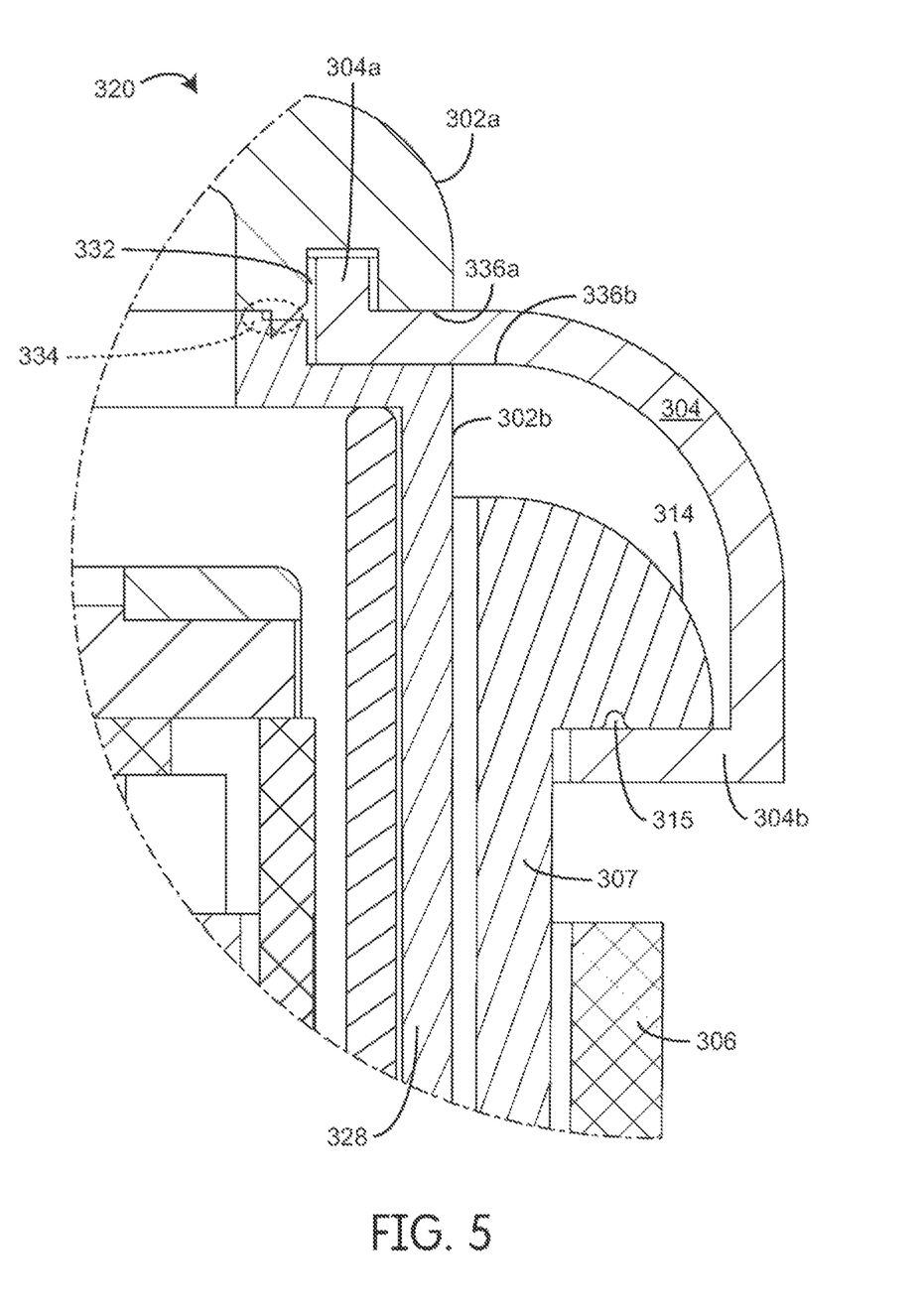
FIG. 5 is a detailed view of the input device of FIG. 4, in accordance with a described implementation.

As best shown by section 320 in FIG. 5, the push button member exterior wall 328 is separated from the inner housing 307 by small gap 330 (not shown to scale) to prevent frictional contact between the exterior wall 328 and the housing 307 from impeding the movement of the push button member 303. Previously known input devices tend to become faulty or inoperable when foreign contaminants are introduced into a similar gap between the moving and stationary portions of the input device. In a significant departure from previously known input devices, the gap 330 is protected from foreign contaminates by a membrane 304 which insulates the gap 330 from such contaminates poured or introduced onto the input device 300 from above. While the implementation of FIG. 5 shows exterior wall 328 and inner housing 307 spaced apart by small gap 300, according to another implementation, there may not be a gap 330, for example, exterior wall 328 and inner housing 307 may be in friction contact.

A first end 304a of the membrane 304 is retained within the lens 302 of the push button member 303 and. moves with the push button member 303 when the push button member 303 is depressed. Lens 302 may include an upper and a lower lens that may be welded together to create lens 302. In some implementations, the upper and lower lens may be ultra-sonically welded together. The upper lens may be actuated (e.g., pressed) by a player to provide input to a gaming controller, while the lower lens may be configured to move with the upper lens during actuation.

A first end 304a of the membrane 304 is retained within the lens 302 of the push button member 303 and moves with the push button member 303 when the push button member 303 is depressed.—A second end 304b of the membrane 304 is attached to an underside portion of the bezel 314 and remains stationary. The membrane 304 is flexible and. deforms slightly from the shown orientation when the push button member 303 is depressed. The membrane 304 may be constructed and installed such that the membrane 304 biases the push button member 303 in the upper-most position in conjunction with the upward force on the push button member 303 provided by the spring 321.

The first end 304a of the membrane 304 has a cross-sectional L-shape and fits within a corresponding cross-sectional L-shaped recess 332 formed within the lens 302. The lens 302 may be formed from an upper lens 302a and a lower lens 302b, as shown in FIG. 5. Upper lens 302a and lower lens 302b may be joined together at lens joint 334 using sonic welding or other joining techniques after the first end 304a of the membrane 304 has been inserted into position as shown. Once the upper lens 302a and the lower lens 302b are joined together with the first end 304a of the membrane 304 within the recess 332, the membrane becomes permanently attached to the lens 302. The cross-sectional L-shape of the first end 302a of the membrane 304 significantly reduces the possibility that liquid or other contaminants will gain access underneath the membrane 304 around the first end 304a of the membrane 304 because those contaminants would have to travel up and around the first end 304a within the recess 332.

Membrane contact areas 336a and 336b on the upper and lower lens 302a and 302b, respectively, may also lightly compress the membrane after the upper and lower lens 302a and 302b have been joined together. This light compression by the contact areas 336a and 336b helps to retain the first end 304a of the membrane within the lens 302 as well as creating an effective seal between the membrane 304 and the lens 302.

The second end 304b of the membrane 304 is attached to the bottom portion of the bezel 314 as shown in FIG. 5. When the input device is installed on a panel of the gaming machine 102. (FIG. 1), the second end 304b of the membrane 304 is pressed between the bottom portion of the bezel 314 and the panel 124 (FIG. 1). This pressing of the second end 304b of the membrane 304 not only secures the second end 304b in place, but also creates a seal between the input device 300 and the panel. A recess 315 formed in the bottom portion of the bezel 314 creates an interference fit that further contributes to the retention of the second end 304b between the bezel 314 and the panel.

Membrane 304 may be welded or otherwise to upper portion of lens 302 and placed over bezel 314. Membrane 304 may be provided within a channel between the upper portion of lens 302 and a lower portion of lens 302. Membrane 304 may be configured to allow movement with actuation of the upper portion of lens 302. Membrane 304 may be in contact with the first and second section of outer housing 306. Membrane 304 may have a first end 304a that moves with lens 302 during actuation and a second end 304b that remains fixed during actuation, e.g., pressed against the panel of the gaming machine.

Figure 6:
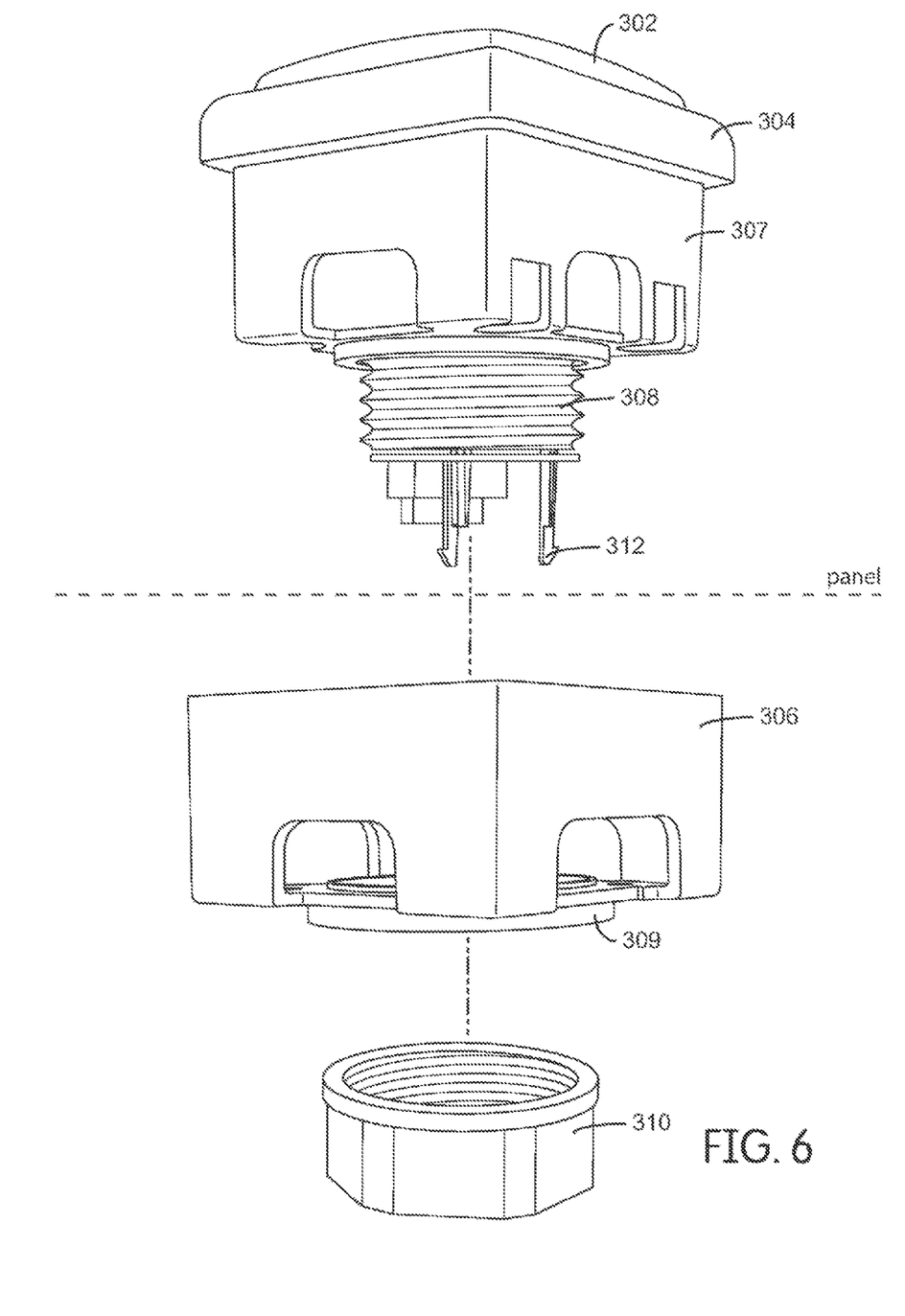
FIG. 6 is an exploded view of an input device in accordance with a described implementation.

FIG. 6 is an exploded view of an input device in accordance with a described implementation. Outer housing 306 may include a first section that extends into an interior region of the electronic gaming machine. Outer housing 306 may include a second section that extends into an exterior of the electronic gaming machine.

Outer housing 306 may include a first section having a bottom wall 309. Bottom wall 309 may define an open space therein for receiving electrical contacts and locking assembly 308. Bottom wall 309 may include at least one upwardly extending side. Bottom wall 309 may also include a top surface connected to the at least one upwardly extending side, Locking assembly 308—may secure electrical contacts via inner housing 307 to outer housing 306. Locking assembly 308 may include one or more locking members, such as spiral ridges, projections, tabs, etc. that couple locking assembly 308 to outer housing 306. The projections may couple input device 300 to the panel. As shown in FIG, 6, a threaded portion and a nut are components of the locking assembly. In another implementations, locking assembly 308 may include a snap fit, friction fit (press fit), fastener, adhesive, etc. Other appropriate locking assemblies may be used to couple the electrical contacts via inner housing 307 to outer housing 306, which couples the input device to a panel of the gaming device.

In some implementations, outer housing 306 may include a first section having bottom wall 309. Bottom wall 309 may be engaged against a first side of a panel of a gaming machine. Outer housing 306 may include a second section having a top surface (not shown). The top surface may be engaged against a second side of the panel. A sufficient pressure/clamping force may be used to compress the membrane so the face of the panel is in contact to form a contaminate-resistant seal.

The construction and arrangement of the elements of the figures as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance or illustration. Any embodiment or design described, herein as "exemplary" is not necessarily to be construed as preferred. or advantageous over other embodiments or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

To provide for interaction with a user, implementations of the subject matter described in this specification can be implemented on a computer having a display device, e.g., a CRT (cathode ray tube), LCD (liquid crystal display), OLEO (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular implementations of the subject matter have been described. Other implementations are within the scope of the following claims.

The invention is claimed as follows:

1. An input device comprising:
an inner housing;
a bezel connected to and extending outward from the inner housing, the bezel including a membrane contact surface;
a member supported by the inner housing, the member defining an opening therein extending around a perimeter of the member, the member being at least partially disposed within the housing and being movable relative to the inner housing from a first position to a second position and from the second position to the first position;
a flexible membrane having a first portion disposed within the opening of the member and a second portion configured to contact the membrane contact surface of the bezel such that the flexible membrane substantially covers the bezel;
an outer housing removably attachable to the inner housing to mount the housing to a panel such that the outer housing at least partially encloses the inner housing and such that the second portion of the flexible membrane is compressed between the membrane contact surface of the bezel and a first surface of the panel; and
a locking assembly including a threaded tip and a counter-threaded nut and configured to enable user adjustment of a degree of compression of the membrane between the contact surface of the bezel and the first surface of the panel, wherein a portion of the outer housing is located between the inner housing and the locking assembly.

2. The input device of claim 1, which includes a biasing element engaged to the member that biases the member to the first position.

3. The input device of claim 2, wherein the biasing element includes a spring.

4. The input device of claim 1, wherein the flexible membrane is configured to deform when the member is moved from the first position to the second position and from the second position to the first position.

5. The input device of claim 1, wherein the member includes a display device.

6. The input device of claim 1, wherein the inner housing and the bezel are integrally formed.

7. The input device of claim 1, wherein the first portion of the flexible membrane is compressed within the opening of the member.

8. The input device of claim 1, wherein the locking assembly is configured such that the user adjustment of the degree of compression of the membrane occurs by threading the counter-threaded nut.

9. The input device of claim 1, wherein the threaded tip extends from the inner housing.

10. The input device of claim 1, wherein the member includes an upper portion and a lower portion joined along a lens joint.

11. The input device of claim 10, wherein the upper portion of the member and the lower portion of the member cooperate to define the opening extending around the perimeter of the member such the opening is defined between the upper portion of the member and the lower portion of the member.

12. The input device of claim 11, wherein the membrane contacts the lens joint.

13. The input device of claim 11, wherein both the upper portion of the member and the lower portion of the member contact the membrane and cooperate to compress the membrane within the opening of the member.

14. The input device of claim 10, wherein the lens joint is adjacent to a portion of the opening.

15. The input device of claim 1, wherein the membrane is compressed in the opening of the member.

16. A machine comprising:
   a panel having a first surface and an opposing second surface; and
   an input device mounted to the panel, the input device including:
   (a) an inner housing;
   (b) a bezel connected to and extending outward from the inner housing, the bezel including a membrane contact surface;
   (c) a member supported by the housing, the member defining an opening therein extending around a perimeter of the member, the member being at least partially disposed within the inner housing and being movable relative to the inner housing from a first position to a second position and from the second position to the first position;
   (d) a flexible membrane having a first portion disposed within the opening of the member and a second portion disposed between the membrane contact surface of the bezel and the first surface of the panel such that the flexible membrane substantially covers the bezel;
   (e) an outer housing removably attachable to the inner housing such that the outer housing at least partially encloses the inner housing and such that the second portion of the flexible membrane is compressed between the membrane contact surface of the bezel and the first surface of the panel; and
   (f) a locking assembly including a threaded tip and a counter-threaded nut and configured to enable user adjustment of a degree of compression of the membrane between the contact surface of the bezel and the first surface of the panel, wherein a portion of the outer housing is located between the inner housing and the locking assembly.

17. The machine of claim 16, which includes a biasing element engaged to the member that biases the member to the first position.

18. The machine of claim 17, wherein the biasing element includes a spring.

19. The machine of claim 16, wherein the flexible membrane is configured to deform when the member is moved from the first position to the second position and from the second position to the first position.

20. The machine of claim 16, wherein the member includes a display device.

21. The machine of claim 16, wherein the inner housing and the bezel are integrally formed.

22. The machine of claim 16, wherein the first portion of the flexible membrane is compressed within the opening of the member.

23. The machine of claim 16, wherein the membrane contact surface of the bezel defines a recess therein into which a portion of the flexible membrane is compressed.

24. The machine of claim 16, wherein the bezel and the member are separated by a gap.

25. The machine of claim 24, wherein the flexible membrane prevents liquid introduced onto the first surface of the panel from being introduced into the gap.

26. The machine of claim 16, which includes a display device, a processor, a memory device, an acceptor configured to accept a first physical item associated with a first monetary value.

27. The machine of claim 26, which includes and a dispenser configured to dispense a second physical item associated with a second monetary value.

28. An input device comprising:
   an inner housing;
   a bezel connected to and extending outward from the inner housing, the bezel including a membrane contact surface;
   a member supported by the inner housing, the member defining an opening therein extending around a perimeter of the member, the member being at least partially disposed within the inner housing and being movable relative to the inner housing from a first position to a second position and from the second position to the first position, the member including an upper portion and a lower portion joined along a lens joint, wherein the upper portion of the member and the lower portion of the member cooperate to define the opening extending around the perimeter of the member such the opening is defined between the upper portion of the member and the lower portion of the member;
   a flexible membrane having a first portion disposed within the opening of the member and a second portion configured to contact the membrane contact surface of the bezel such that the flexible membrane substantially covers the bezel;
   an outer housing removably attachable to the inner housing to mount the housing to a panel such that the outer housing at least partially encloses the inner housing and such that the second portion of the flexible membrane is compressed between the membrane contact surface of the bezel and a first surface of the panel; and
   a locking assembly configured to enable user adjustment of a degree of compression of the membrane between the contact surface of the bezel and the first surface of the panel.

29. A machine comprising:
   a panel having a first surface and an opposing second surface; and
   an input device mounted to the panel, the input device including:
   (a) an inner housing;
   (b) a bezel connected to and extending outward from the inner housing, the bezel including a membrane contact surface;
   (c) a member supported by the inner housing, the member defining an opening therein extending around a perimeter of the member, the member being at least partially disposed within the inner housing and being movable relative to the inner housing from a first position to a second position and from the second position to the first position, the member including an upper portion and a lower portion joined along a lens joint, wherein the upper portion of the member and the lower portion of the member cooperate to define the opening extending around the perimeter of the member such the opening is defined between the upper portion of the member and the lower portion of the member;
   (d) a flexible membrane having a first portion disposed within the opening of the member and a second portion disposed between the membrane contact surface of the bezel and the first surface of the panel such that the flexible membrane substantially covers the bezel;

(e) an outer housing removably attachable to the inner housing such that the outer housing at least partially encloses the inner housing and such that the second portion of the flexible membrane is compressed between the membrane contact surface of the bezel and the first surface of the panel; and
(f) a locking assembly configured to enable user adjustment of a degree of compression of the membrane between the contact surface of the bezel and the first surface of the panel.

\* \* \* \* \*